United States Patent [19]

Tanahashi et al.

[11] Patent Number: 4,624,343

[45] Date of Patent: Nov. 25, 1986

[54] SPEED CONTROL APPARATUS FOR ELEVATOR

[75] Inventors: Tooru Tanahashi, Gifu; Yoshio Miyanishi, Nagoya, both of Japan

[73] Assignee: Mitsubishi Denki Kabushiki Kaisha, Tokyo, Japan

[21] Appl. No.: 706,311

[22] Filed: Feb. 27, 1985

[30] Foreign Application Priority Data

Feb. 29, 1984 [JP] Japan ................................ 59-38211

[51] Int. Cl.$^4$ ................................ H02P 7/36

[52] U.S. Cl. ................................ 187/29 R; 318/806

[58] Field of Search .................. 187/29; 318/332, 474, 318/476, 802, 806

[56] References Cited

U.S. PATENT DOCUMENTS

| | | | |
|---|---|---|---|
| 4,414,499 | 11/1983 | Hedges | 318/806 X |
| 4,479,565 | 10/1984 | Nomura | 187/29 R |
| 4,533,862 | 8/1985 | Salihi | 318/806 X |
| 4,542,324 | 9/1985 | Leuthen | 318/806 X |
| 4,567,419 | 1/1986 | Watanabe | 187/29 R X |

FOREIGN PATENT DOCUMENTS

| | | | |
|---|---|---|---|
| 54-1551 | 8/1979 | Japan | 187/29 R |

*Primary Examiner*—William M. Shoop, Jr.
*Assistant Examiner*—W. E. Duncanson, Jr.
*Attorney, Agent, or Firm*—Leydig, Voit & Mayer, Ltd.

[57] ABSTRACT

A speed control apparatus for an elevator is so constructed that an operating period of time is limited on the basis of a predetermined current command value or an output from a detector for detecting current to be supplied to an induction motor, thereby to render a load time factor of the induction motor a predetermined value or less and to maintain at or below a permissible value a temperature rise value based on a quantity of heat generated by a winding of the induction motor.

Thus, the induction motor is prevented from burning even when the induction motor is operated at low speed in, for example, a manual operation mode for installation, maintenance and inspection, or the like.

9 Claims, 5 Drawing Figures

SPEED CONTROL APPARATUS FOR ELEVATOR

BACKGROUND OF THE INVENTION

The present invention relates to a speed control apparatus for elevators, and more particularly to a speed control apparatus for elevators which prevents the burning of a motor winding during a low speed operation.

There has heretofore been an elevator speed control apparatus of the pertinent type as desclosed in the official gazette of Japanese Patent Application Laid Open No. 56-123795, and an arrangement block diagram thereof is shown in FIG. 1. Referring to the figure, an elevator is constructed of a rectifier 2 which receives an input from an A.C. power source 1 to convert it into direct current, a smoothing capacitor 3 which smooths the output voltage of the rectifier 2, an inverter 4 which includes a transistor and a diode and which inverts the D.C. voltage smoothed by the capacitor 3 into alternating current of variable voltage and variable frequency, an induction motor 5 which is driven by an A.C. source voltage inverted by the inverter 4, a sheave 6 which is driven by the rotation of the induction motor 5, a traction rope 7 which is wound round the sheave 6, a cage 8 which is coupled to one end of the traction rope 7, and a counterweight 9 which is coupled to the other end of the traction rope 7. In such elevator, the speed control apparatus for the elevator comprises a speed pattern generator 11 which generates a speed command signal 11*a*, a current detector 12 which detects the current to be supplied to the induction motor 5, a speed detector or tachometer generator 13 which detects the rotational speed of the induction motor 5, a control signal generating circuit 14 which compares and operates the respective outputs of the speed detector 13 and the speed pattern generator 11, a pulse width modulation (hereinbelow, termed "PWM") comparator 16 which compares the respective outputs of the control signal generating circuit 14 and the current detector 12 to generate a pulse width modulation command, and a base driving circuit 17 which generates a gate signal for the control of the transistor constituting the inverter 4 on the basis of the PWM command of the PWM comparator 16.

Here, the induction motor 6 usually employed is of the self-ventilating type. In a case where the elevator is being operated at its rated speed, the rotational frequency of the induction motor 5 is high, and hence, the cooling effect is kept high. In contrast, in a case where it is being operated at a low speed, particularly in a manual operation mode for installation, maintenance and inspection, or the like, the cooling effect worsens, and the winding of the induction motor 5 might burn when the low speed operation is continued for a long time.

The relationship between the rate of ventilation Q required for the cooling of the induction motor 5 and the thermal resistance R of the induction motor is indicated as follows:

$$Q=Q_o\cdot(N/N_o) \quad (1)$$

where $N_o$; rated rotational frequency of the motor,

N; rotational frequency of the motor, $Q_o$; rate of ventilation in the rated rotation operation.

$$R=R_o\cdot(Q_o/Q)^{0.4\ to\ 0.5} \quad (2)$$

where $R_o$; thermal resistance in the rated rotation operation.

From Eqs. [1] and [2] mentioned above, as the rotational frequency N lowers, the rate of ventilation Q decreases, and further, as the rate of ventilation Q decreases, the thermal resistance R increases. In this manner, the lowering of the rotational frequency increases the thermal resistance, resulting in the disadvantage that the motor winding burns.

In order to avoid the disadvantage, the prior art has set a limit to the period of time of the manual operation so as to cope with the burning. With this measure, however, when the elevator is operated under a heavy load in excess of a predetermined value beyond the limit period, the burning of the motor winding is still feared to occur.

SUMMARY OF THE INVENTION

The present invention aims to overcome the disadvantage stated above, and proposes a speed control apparatus for an elevator in which an induction motor is operated with its load time factor (% Ed) maintained at a predetermined value, whereby the induction motor is prevented from burning even when it is operated at low speed, for example, in the manual operation mode of installation, maintenance and inspection, or the like.

PREFERRED EMBODIMENT OF THE INVENTION

Figure 1:
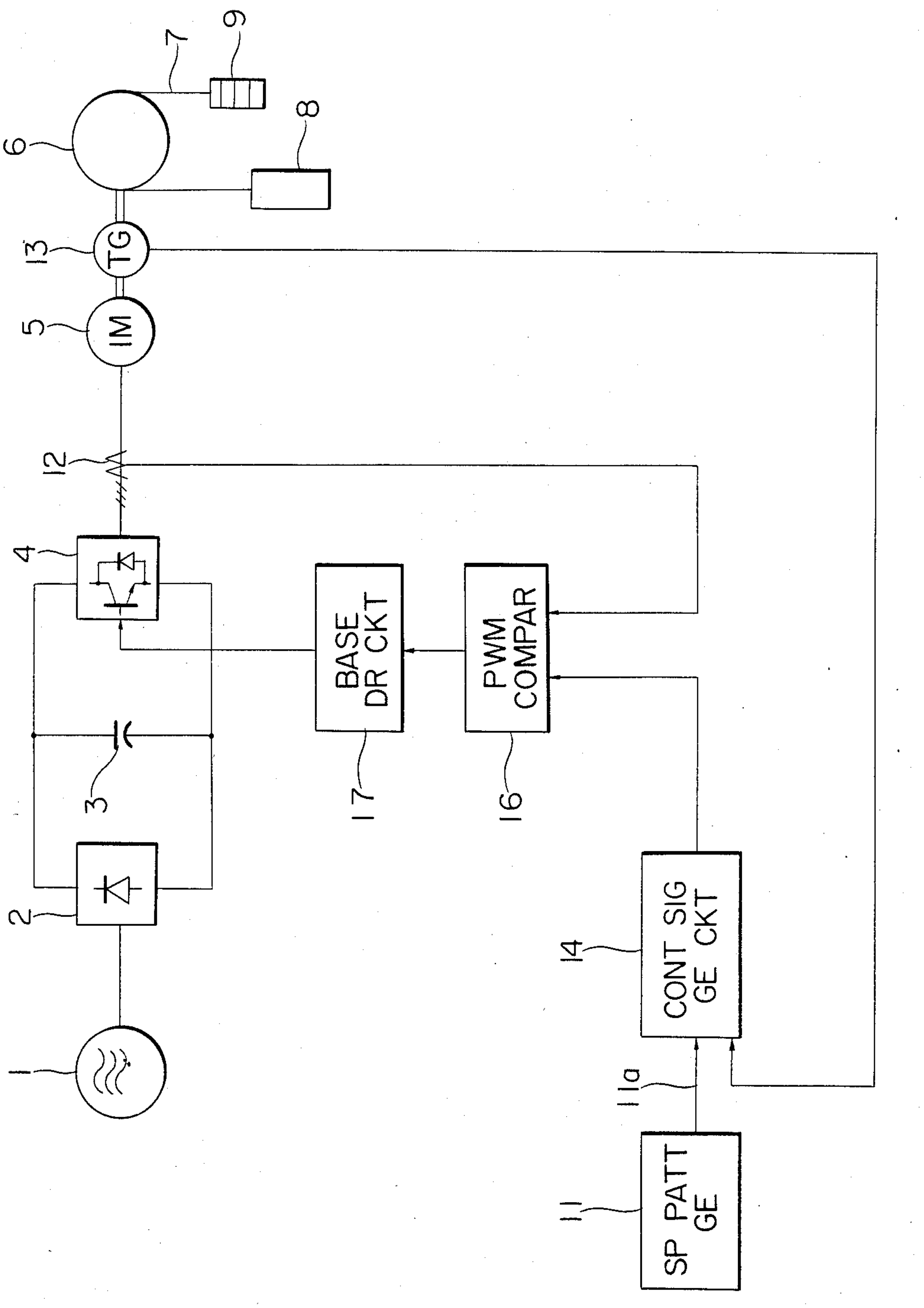
FIG. 1 shows a conventional speed control apparatus for an elevator.
Figure 2:
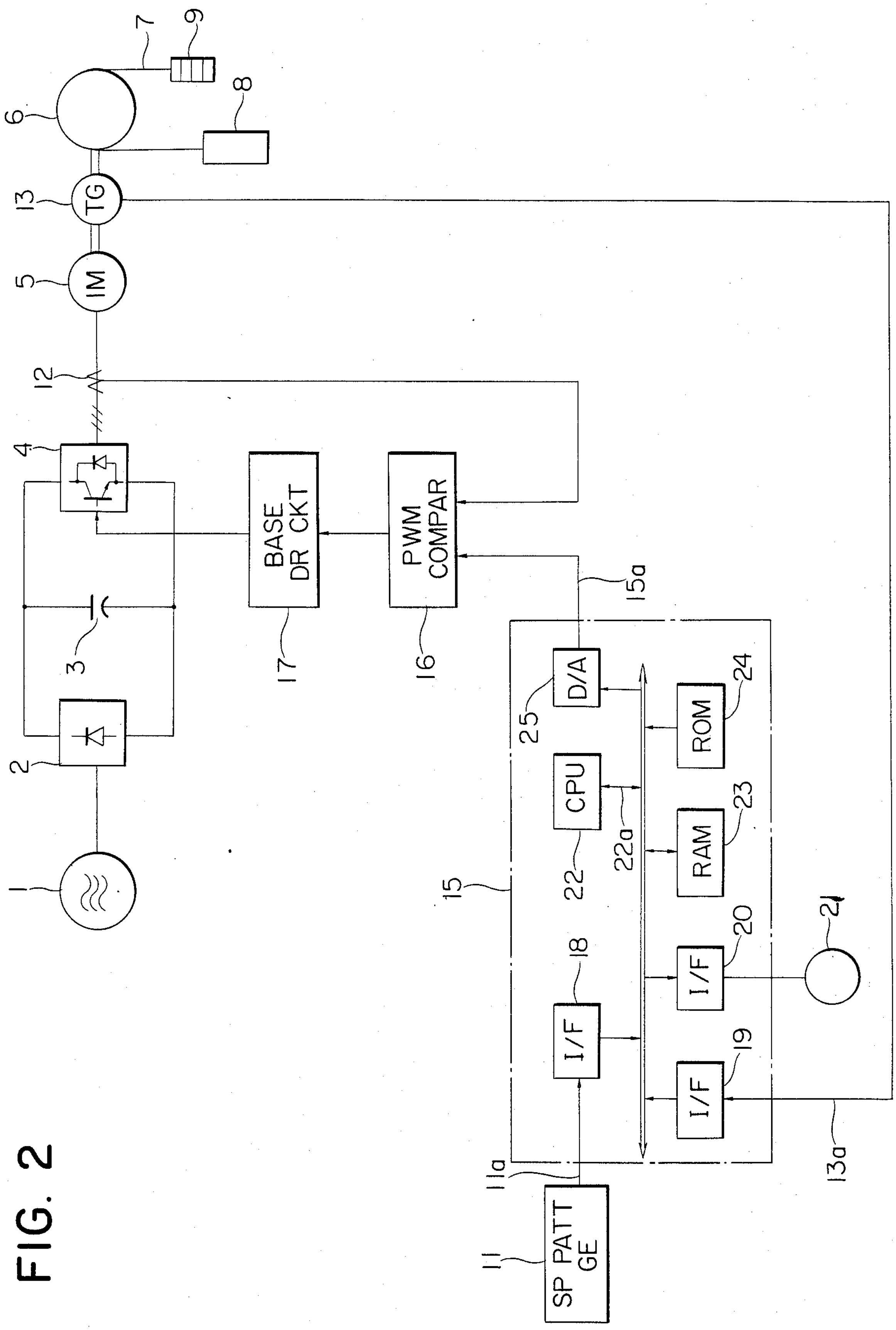
FIG. 2 is a general circuit diagram showing an embodiment of the present invention.
Figure 3:
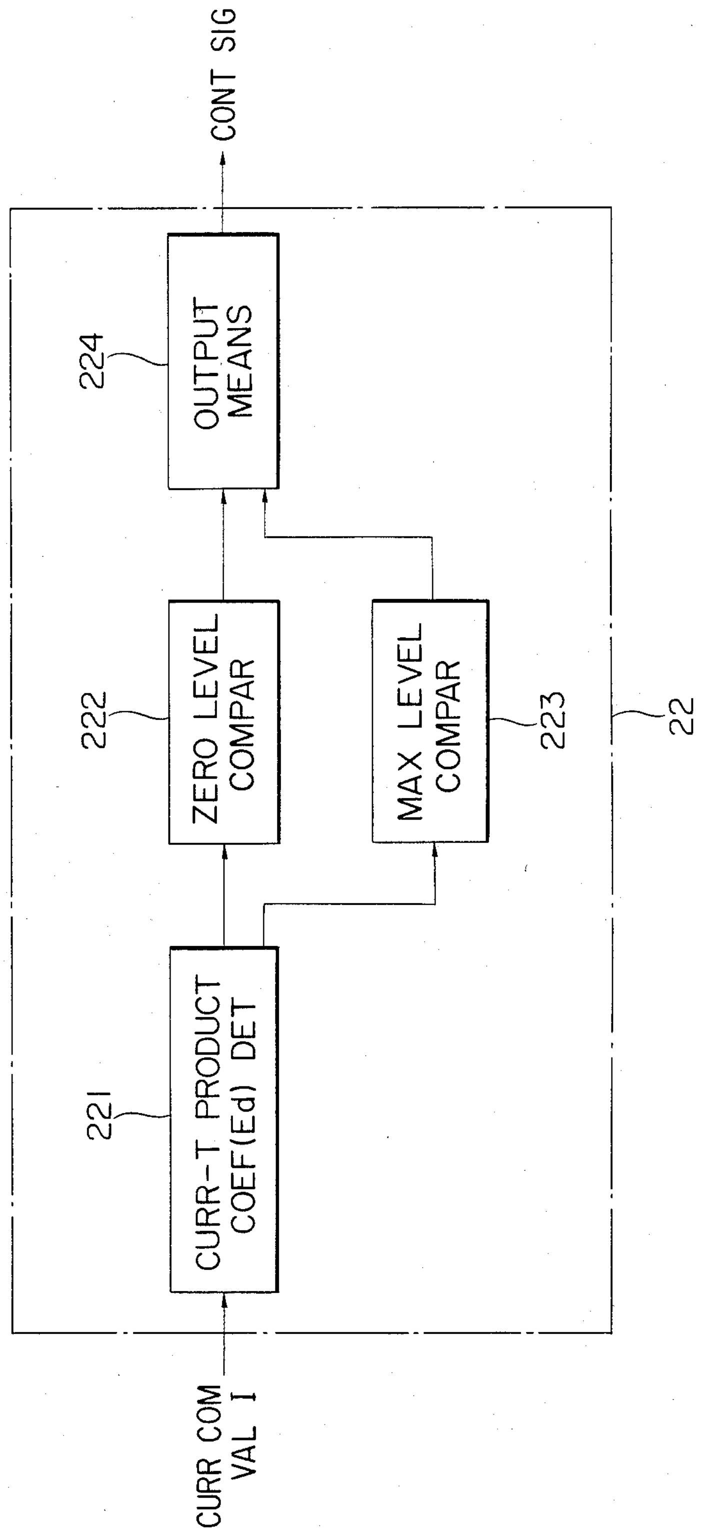
FIG. 3 is a block diagram of the detailed arrangement of a principal constituent in FIG. 2.

Now, one embodiment of the present invention will be described with reference to FIGS. 2 and 3. FIG. 2 shows a general circuit diagram depicting the present embodiment partly in blocks, and FIG. 3 a block diagram of the detailed arrangement of a principal constituent in FIG. 2. In FIG. 2, the same symbols as in FIG. 1 showing the general circuit diagram of the prior-art apparatus shall indicate identical constituents respectively. Referring to the figures, a speed control apparatus for an elevator according to the present embodiment is arranged as follows. Both the speed command signal 11*a* delivered from the speed pattern generator 11 and the speed detection signal 13*a* delivered from the speed detector 13 are applied to a control signal generating circuit 15 which is constructed by the use of a microprocessor. On the basis of the operated result of the control signal generating circuit 15, a current control signal 15*a* is applied to the inverter 4 through the PWM comparator 16 as well as the base driving circuit 17, whereby the current to be supplied to the induction motor 5 is adjusted to control the speed of the elevator.

The control signal generating circuit 15 is arranged as follows. The speed command signal 11*a* is input to a central processing unit (hereinbelow, termed 'CPU') 22 through an output converter (hereinbelow, termed 'I/F') 18, while the speed detection signal 13*a* is input thereto through an I/F 19. Then, on the basis of the data of a RAM 23 or a ROM 24, the CPU 22 sets a current command value so that the load time factor of the induction motor 5 may be maintained at or below a predetermined value. The current command value I is converted by a D/A converter 25 from a digital quantity into an analog quantity, which is output.

The CPU 22 is composed of a coefficient detector 221 which detects a current-time product coefficient based on the load time factor (% Ed), a zero level comparator 222 which compares the current-time product coefficient with a zero level, a maximum level comparator 223 which compares the current-time product coefficient with a maximum level, and output means 224 which generates a control signal on the basis of the comparison results of the respective comparators 222 and 223 of the zero level and the maximum level. This CPU 22 produces the control signal for maintaining the load time factor of the induction motor 5 at or below the predetermined value, thereby to prevent the winding of the induction motor 5 from burning.

More specifically, letting I′ denote current flowing through the induction motor 5, the quantity of heat $P_\omega$ generated by the induction motor winding is expressed by:

$$P_\omega = r \cdot I'^2 \tag{3}$$

Here, r indicates the resistance of the winding. On the other hand, a temperature value $\theta$ by which the temperature of the motor rises in accordance with the quantity of heat $P_\omega$ of the induction motor winding is indicated as:

$$\theta = R \cdot P_\omega \tag{4}$$

Here, R indicates the radiation resistance in the manual operation mode.

Therefore, letting $\theta_{max}$ denote a permissible value which is the heat-resisting maximum temperature of the induction motor, the load time factor (% Ed) is expressed as:

$$\%\ Ed = (\theta_{max}/R \cdot P_\omega) \times 100 \tag{5}$$

In the above equation [5], $(R \cdot P_\omega)$ signifies a temperature rise value in the steady state of the induction motor 5. Accordingly, insofar as the load time factor (% Ed) which is the ratio between this temperature rise value and the permissible value $\theta_{max}$ is kept at or below the predetermined value, the induction motor can be operated without burning.

Figure 4:
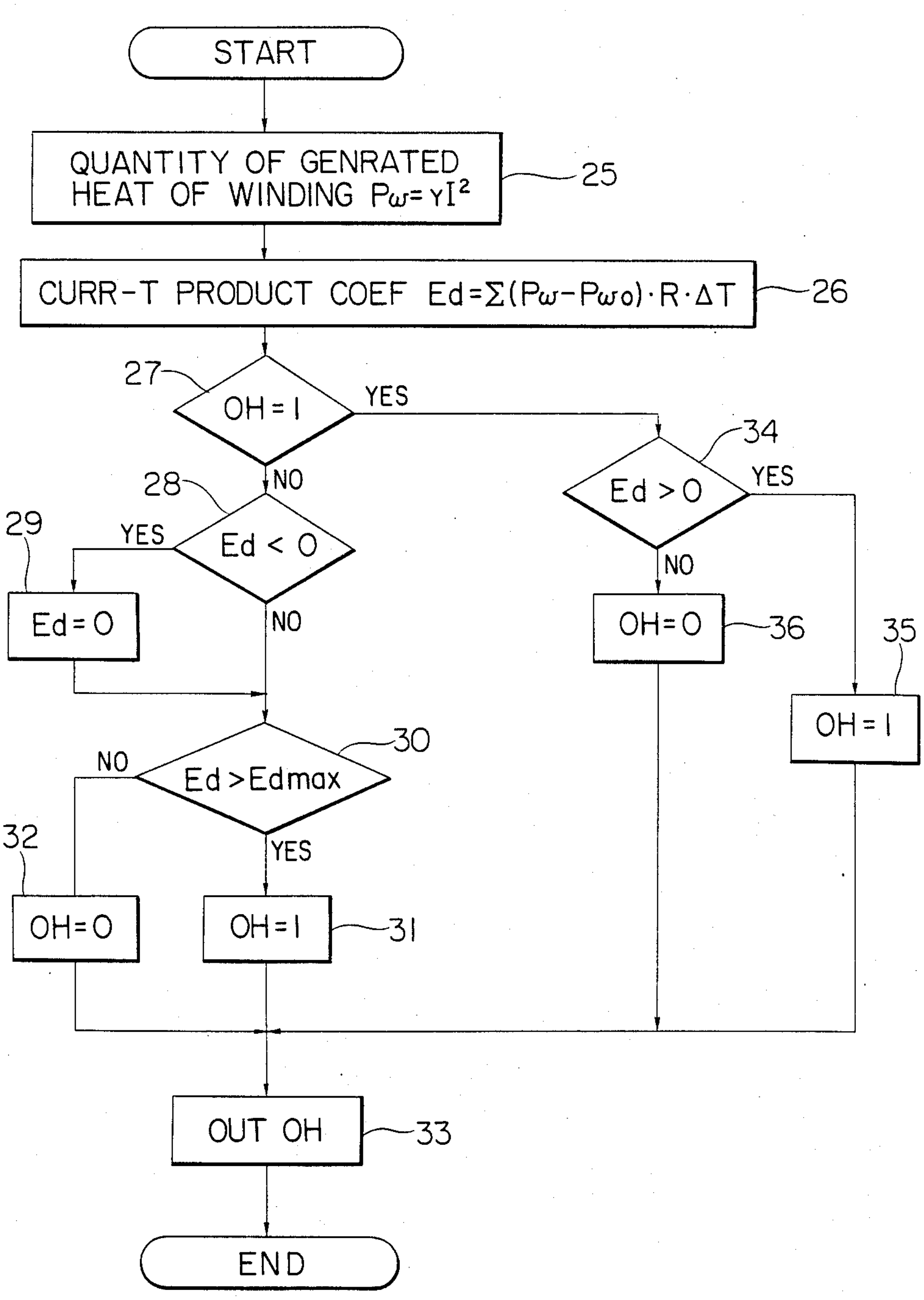
FIG. 4 is a flow chart for explaining the operation of the device in FIG. 2.

Next, the operation of the embodiment will be described with reference to FIGS. 2, 3 and 4. FIG. 4 is a flow chart showing the routine of operations in the CPU 22, RAM 23 and ROM 24 in the control signal generating circuit 15.

Steps 25 and 26 are the operations of the current-time product coefficient (hereinbelow, termed 'Ed') detector 221 shown in FIG. 3. On the basis of Eq. [3], Step 25 squares the current command value I corresponding to the speed control signal and evaluates the quantity of generated heat $P_\omega$ of the motor winding owing to the product between the squared value $I^2$ and the winding resistance r. Step 26 finds Ed which is a value obtained in such a way that the difference is taken between the quantity of generated heat $P_\omega$ evaluated by Step 25 and a quantity of generated heat $P_{\omega o}$ required for the temperature rise of the winding to reach the permissible value $\theta_{max}$ in case of continuously supplying current to the induction motor 5, and that the product between the value of the difference and the radiation resistance R as well as a sampling time $\Delta t$ is integrated with respect to time.

Subsequently, Step 27 decides the detection signal OH which is provided as the operated result of the CPU 22. When the detection signal has become OH=1, a stop command is sent to a relay 21 through an I/F 20 shown in FIG. 2. and the elevator is stopped by the operation of the relay 21.

Assuming now that the manual operation has been started, Ed is obtained by Steps 25 and 26. Since OH=O holds on this occasion, the operations of Steps 28, 30 and 32 are performed, and the elevator can be operated with OH=O held as it is. Further, when the operation of the elevator is continued for a long time subject to the relation of $P_\omega > P_{\omega o}$, Ed > Ed max comes to hold. At the point of time at which Ed > Ed max has held, OH=1 is established by the operations of Steps 30 and 31, the stop command is sent to the relay 21 through the I/F 20 shown in FIG. 2, and the elevator is immediately stopped by the operation of the relay 21.

When the elevator has stopped, the current command value I which is output from the CPU 22 becomes zero. Accordingly, the operated result of Step 25 is $P_\omega = O$, and Ed evaluated by Step 26 continues to decrease at a fixed rate. While Ed is decreasing, the elevator assumes the state of OH=1, and hence, the stop command is continuously sent from the CPU 22 to the relay 21 through the I/F 20 on the basis of the operated results of Steps 34 and 35.

When Ed ≦ O has held upon further lapse of time, the detection signal assumes OH=O, the CPU 22 no longer sends the stop command to the relay 21, and this relay 21 is reset, whereupon the elevator falls into the operable state again.

The operations of Steps 28 and 29 serve to prevent the value of Ed from continuing to decrease during the stop.

Figure 5:
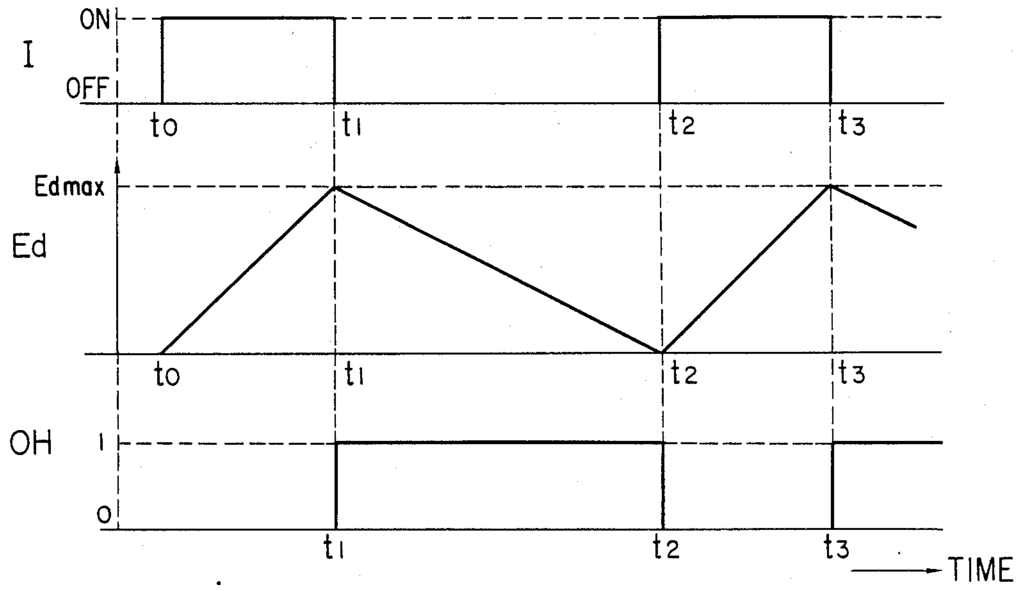
FIG. 5 is a graph showing the relations of values I, Ed and OH in the operation of FIG. 4.

A graph of the relations of the current command value I, Ed and OH is shown in FIG. 5 in order to elucidate the above operation. The figure illustrates the relations in the case of operating the elevator with a current adapted to establish $P_\omega \sim 3\, P_{\omega o}$. Referring to the figure, letter I indicates the ON or OFF state of the current command value. At a time $t_o$, the current command value I falls into the ON state, under which the integral value Ed increases gradually. When Ed reaches the value Ed max at a time $t_1$, OH=1 holds, whereupon the current command value I keeps the OFF state from the time $t_1$ to a time $t_2$. Under the OFF state of the current command value I, Ed gradually decreases back to a predetermined value. At the time $t_2$ at which Ed has been restored to the predetermined value, OH=O is assumed, and the current command value I falls into the ON state again. By repeating the ON and OFF states of the current command value I in this manner, the load time factor can be maintained at or below the predetermined value.

It is understood from FIG. 4 that the load time factor (% Ed) becomes:

$$\begin{aligned}\%\ Ed &= \theta_{max}/(R \cdot P) \\ &= (R \cdot P_{\omega o})/(R \cdot 3\, P_{\omega o}) \\ &= \tfrac{1}{3}\end{aligned}$$

While the embodiment has been arranged so as to render the load time factor (% Ed) the predetermined value or less by inputing the current command value to the CPU, an arrangement is also possible which comprises a current detector for detecting the value of current supplied to the induction motor and in which the load time factor (% Ed) is maintained at the predetermined value on the basis of the current detection signal of the current detector.

While the embodiment has been arranged so as to render the load time factor (% Ed) the predetermined value or less, the speed control apparatus can also be arranged so as to maintain the load time factor (% Ed) at the predetermined value.

As set forth above, the present invention is so constructed that an operating period of time is limited on the basis of an output from a current detector for detecting current to be supplied to an induction motor or a predetermined current command value, thereby to render the load time factor of the induction motor a predetermined value or less. Accordingly, a temperature rise value based on the quantity of heat generated by the winding of the induction motor can be maintained at or below a permissible value. This brings forth the effect that a manual operation at low speed can be performed without the burning of the induction motor.

We claim:

1. In a speed control apparatus for an elevator having a speed pattern generator which generates a speed command of the elevator, a current detector which detects current to be supplied to an induction motor for hositing the elevator, a speed detector which detects a rotational speed of the induction motor, and a pulse width modulation comparator which compares and operates the respective outputs of the speed detector and the speed pattern generator and which compares the comparison value with the output of the current detector so as to generate a pulse width modulation command for controlling the speed of the induction motor; a speed control apparatus for an elevator comprising a control signal generating circuit which sends said pulse width modulation comparator a control signal for limiting an operating period of time on the basis of the output of said current detector so as to render a load time factor a predetermined value or less.

2. A speed control apparatus for an elevator as defined in claim 1 wherein said control signal generating circuit comprises coefficient detection means to detect a current-time product coefficient based on the load time factor (% Ed), zero level comparison means to compare the current-time product coefficient with a zero level, maximum level comparison means to compare the current-time product coefficient with a maximum level, and output means to generate the control signal on the basis of compared results of the respective comparison means of the zero level and the maximum level.

3. A speed control apparatus for an elevator as defined in claim 2 wherein said coefficient detection means receives the detected result of said current detector as its input and detects the current-time product coefficient on the basis of the input.

4. A speed control apparatus for an elevator as defined in claim 2 wherein said coefficient detection means detects the current-time product coefficient in accordance with a current command value previously set on the basis of ratings of the induction motor.

5. A speed control apparatus for an elevator as defined in claim 2 wherein said coefficient detection means calculates a quantity of heat generated by the induction motor and provides an integral value based on the calculated result, the value increasing gradually during operation of the elevator and decreasing gradually during stop of the elevator.

6. A speed control apparatus for an elevator as defined in claim 2 wherein said output means provides the control signal for stopping the elevator when both said zero level comparison means and said maximum level comparison means produce the comparison results indicating that the current-time product coefficient exceeds the respective set levels.

7. A speed control apparatus for an elevator as defined in claim 6 wherein during a period during which said output means is providing the control signal for stopping the elevator, said zero level comparison means performs the comparison operation of the current-time product coefficient, and when the current-time product coefficient has become less than the zero level, said output means ceases the provision of the control signal for stopping the elevator.

8. A speed control apparatus for an elevator as defined in claim 2 wherein when said output means does not provide the control signal for stopping the elevator and besides the current-time product coefficient is less than the zero level, said zero level comparison means deems the current-time product coefficient to be of the zero level and delivers the corresponding signal.

9. A speed control apparatus for an elevator as defined in claim 1 wherein said control signal generating circuit creates and sends the control signal when the elevator is operated at a low speed below a rated speed.

* * * * *